US009858563B2

(12) United States Patent
Tabata

(10) Patent No.: US 9,858,563 B2
(45) Date of Patent: Jan. 2, 2018

(54) INFORMATION PROCESSING APPARATUS USING OBJECT RECOGNITION TECHNIQUE AND METHOD FOR OPERATING THE SAME

(71) Applicant: TOSHIBA TEC KABUSHIKI KAISHA, Tokyo (JP)

(72) Inventor: Sunao Tabata, Sunto Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 263 days.

(21) Appl. No.: 14/682,683

(22) Filed: Apr. 9, 2015

(65) Prior Publication Data
US 2016/0300213 A1    Oct. 13, 2016

(51) Int. Cl.
*G06Q 20/00* (2012.01)
*G06Q 20/20* (2012.01)
*G07G 1/01* (2006.01)
*G07G 1/00* (2006.01)
*G06F 17/30* (2006.01)

(52) U.S. Cl.
CPC ..... *G06Q 20/208* (2013.01); *G06F 17/30259* (2013.01); *G07G 1/0036* (2013.01); *G07G 1/01* (2013.01)

(58) Field of Classification Search
CPC ......... G06K 15/00; G06Q 20/18; G06F 17/30
USPC .................................. 705/23; 235/375, 383
See application file for complete search history.

(56) References Cited

U.S. PATENT DOCUMENTS

| 5,497,314 | A  | * | 3/1996 | Novak | A47F 9/046 235/383 |
| 9,412,050 | B2 | * | 8/2016 | He | G06K 9/629 |
| 2011/0215147 | A1 | * | 9/2011 | Goncalves | G07G 1/0063 235/383 |
| 2012/0175412 | A1 | * | 7/2012 | Grabiner | G06F 19/327 235/375 |
| 2012/0265628 | A1 | * | 10/2012 | Jacobs | G07G 1/01 705/23 |

FOREIGN PATENT DOCUMENTS

JP        5647637 B2    1/2015

* cited by examiner

*Primary Examiner* — Rokib Masud
(74) *Attorney, Agent, or Firm* — Patterson & Sheridan, LLP

(57) ABSTRACT

An information processing apparatus for identifying an item to be purchased during a checkout process includes an operation unit configured to receive user inputs, a display unit configured to display a series of user interfaces generated during the checkout process, an imaging unit configured to capture an image of the item to be purchased and generate image data thereof, and a control unit. The control unit is configured to select an operational mode from a plurality of operational modes including a first mode and a second mode and to control the display unit to display a first screen including one or more user-selectable candidates according to a first layout when the selected mode is the first mode, and a second screen including one or more user-selectable candidates according to a second layout that is the same as the first layout when the selected mode is the second mode.

20 Claims, 17 Drawing Sheets

| MERCHANDISE CODE | MERCHANDISE NAME | SALES PRICE |
|---|---|---|
| XXXX | RINGO (APPLE) | ¥100 |
| XXXX | KAKI (JAPANESE PERSIMMON) | ¥80 |
| XXXX | MIKAN (MANDARIN ORANGE) | ¥60 |
| XXXX | SUIKA (WATERMELON) | ¥250 |

FIG. 4

| MERCHANDISE CODE | CATEGORY 1 | CATEGORY 2 | CATEGORY 3 | INDEX | MERCHANDISE NAME | FEATURE VALUE |
|---|---|---|---|---|---|---|
| XXXXX | FRUITS | KAKI (JAPANESE PERSIMMON) | KAKI (JAPANESE PERSIMMON: JIRO) | KA-KA | KAKI (JAPANESE PERSIMMON: JIRO) | XXXXX |
| XXXXX | FRUITS | KAKI (JAPANESE PERSIMMON) | KAKI (JAPANESE PERSIMMON: FUYU) | KA-KA | KAKI (JAPANESE PERSIMMON: FUYU) | XXXXX |
| XXXXX | FRUITS | KIWI FRUITS | KIWI GOLD | KA-KI | KIWI GOLD | XXXXX |
| XXXXX | FRUITS | KIWI FRUITS | KIWI GREEN | KA-KI | KIWI GREEN | XXXXX |
| ooooo | ooooo | ooooo | ooooo | ooooo | ooooo | ooooo |
| XXXXX | ROOT CROPS | GOBO (BURDOCK ROOT) | — | KA-KO | GOBO (BURDOCK ROOT) | XXXXX |
| ooooo | ooooo | ooooo | — | ooooo | ooooo | ooooo |
| XXXXX | LEAF VEGETABLES | KYABETSU (CABBAGE) | — | KA-KI | KYABETSU (CABBAGE) | XXXXX |
| ooooo | ooooo | ooooo | ooooo | ooooo | ooooo | ooooo |

FIG. 5

| MERCHANDISE CODE | MERCHANDISE NAME | FEATURE VALUE | SIMILARITY |
|---|---|---|---|
| XXXXX | KAKI (JAPANESE PERSIMMON: JIRO) | XXXXX | 2% |
| XXXXX | KAKI (JAPANESE PERSIMMON: FUYU) | XXXXX | 3% |
| XXXXX | KIWI GOLD | XXXXX | 95% |
| XXXXX | KIWI GREEN | XXXXX | 10% |
| ○○○○○ | ○○○○○ | ○○○○○ | ○○○○○ |
| XXXXX | GOBO (BURDOCK ROOT) | XXXXX | 2% |
| ○○○○○ | ○○○○○ | ○○○○○ | ○○○○○ |
| XXXXX | KYABETSU (CABBAGE) | XXXXX | 1% |
| ○○○○○ | ○○○○○ | ○○○○○ | ○○○○○ |

| OPERATION TYPE | TABLE PROCESSING MODE | RECOGNITION PROCESSING MODE |
|---|---|---|
| Type A | FIG. 10A | FIG. 10B |
| Type B | FIG. 11A | FIG. 11B |

INFORMATION PROCESSING APPARATUS USING OBJECT RECOGNITION TECHNIQUE AND METHOD FOR OPERATING THE SAME

FIELD

Embodiments described herein relate generally to an information processing apparatus using an object recognition technique.

BACKGROUND

A check-out system (POS system) specifies an item to be purchased based on image data of the item using an object recognition technique in an operational mode, instead of scanning a barcode or the like attached to the item. One type of such a check-out system displays one or more candidate items or one or more candidate categories of the candidate items. Then, the check-out system receives a user selection of one of the candidate items or the candidate categories. When, the item to be purchased is specified through the user selection, the check-out system performs checkout processing of the specified item.

There are other existing methods for specifying the item to be purchased. For example, the item to be purchased can be specified based on user inputs, without using either the object recognition technique or the barcode scanning. As the number of methods for specifying the item to be purchased increases, however, the user will need to remember a different operational procedure for each such method for specifying the item to be purchased.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 3 illustrates a PLU file stored in the check-out system.

FIG. 4 illustrates a data structure of a table stored in the check-out system.

FIG. 5 illustrates the table in FIG. 4 in a simplified manner.

DETAILED DESCRIPTION

In general, according to one embodiment, an information processing apparatus for identifying an item to be purchased during a checkout process includes an operation unit configured to receive user inputs, a display unit configured to display a series of user interfaces generated during the checkout process, an imaging unit configured to capture an image of the item to be purchased and generate image data thereof, and a control unit. The control unit is configured to select an operational mode from a plurality of operational modes including a first mode and a second mode and to control the display unit to display a first screen including one or more user-selectable candidates according to a first layout when the selected mode is the first mode, and a second screen including one or more user-selectable candidates according to a second layout that is the same as the first layout when the selected mode is the second mode.

Hereinafter, a description will be given of a check-out system according to an embodiment.

Figure 1:
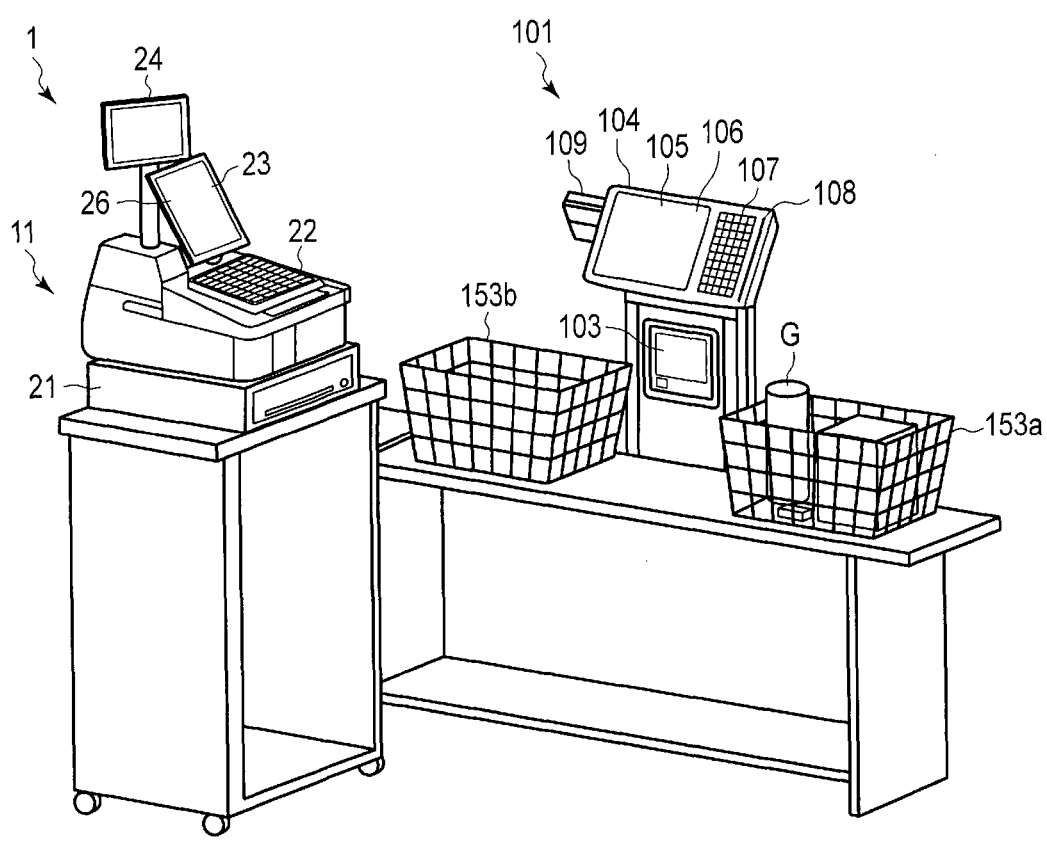
FIG. 1 illustrates a check-out system (POS system) according to an embodiment.

FIG. 1 illustrates a check-out system (POS system) 1.

As illustrated in FIG. 1, the check-out system 1 includes a merchandise reading device 101 which obtains information relating to merchandises and a POS terminal 11 which registers and checks out one or more items purchased in one transaction.

According to the embodiment, the merchandise reading device 101 performs data processing by executing the merchandise presentation method according to the embodiment. In addition, the merchandise reading device 101 and the POS terminal 11 may share and cooperatively perform the processing relating to the merchandise presentation method according to the embodiment.

The POS terminal 11 includes a drawer 21, a keyboard 22, a display device 23, and a display device 24 for a customer. A touch panel 26 is provided on a display surface of the display device 23, and it is possible to transmit an input on the touch panel 26 to the POS terminal 11.

The merchandise reading device 101 is connected to the POS terminal 11 so as to be able to communicate with the POS terminal 11. In addition, a reading window 103 and a display and operation unit 104 are included in the merchandise reading device 101.

The display and operation unit 104 includes a display device 106 as a display unit on which a touch panel 105 is laminated. At a right position of the display device 106, a keyboard 107 is disposed. At a right position of the keyboard 107, a card reading groove 108 of a card reader (not illustrated), is provided. On the back left side of the display and operation unit 104, when viewed from an operator, a display device 109 for a customer for providing a customer with information is disposed.

Figure 2:
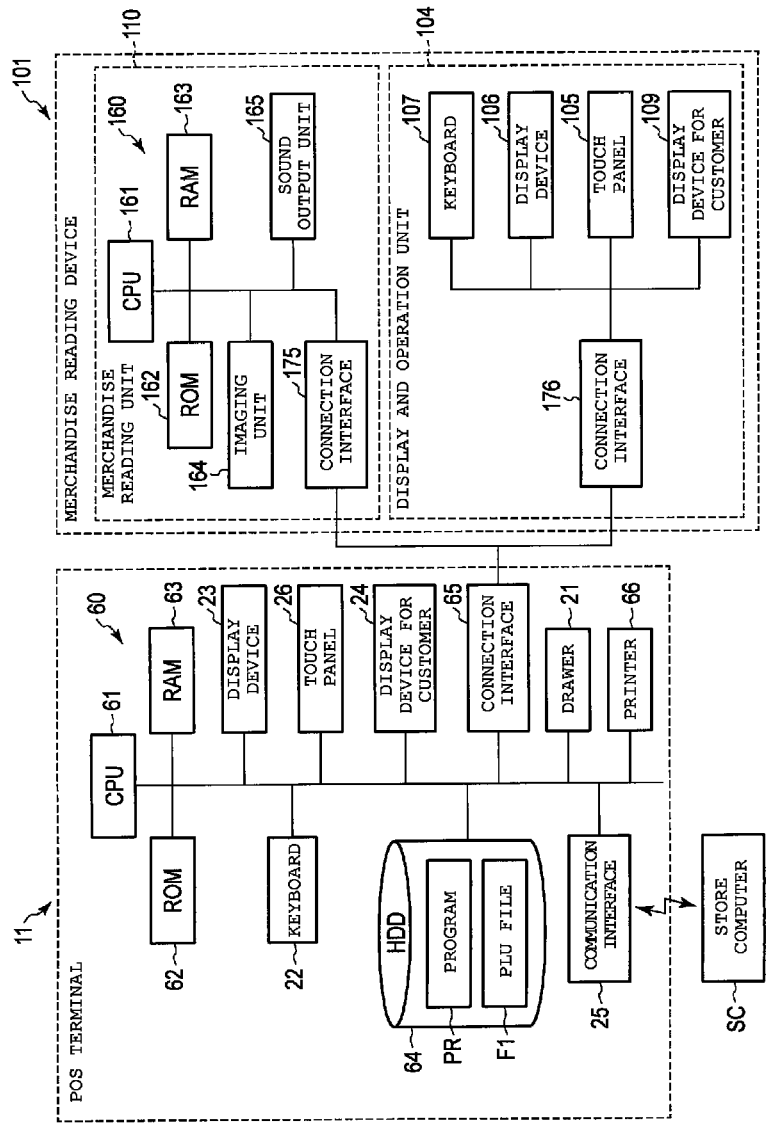
FIG. 2 is a block diagram of a POS terminal and a merchandise reading device of the check-out system.

The merchandise reading device 101 as described above includes a merchandise reading unit 110 (see FIG. 2). In the merchandise reading unit 110, an imaging unit 164 (see FIG. 2) is disposed behind the reading window 103. A first shopping basket 153a, which is brought by a customer, accommodates an item G relating to one transaction. The item G in the first shopping basket 153a is moved to a second shopping basket 153b by an operator who operates the merchandise reading device 101. In the course of the moving, the item G is directed to the reading window 103 of the merchandise reading device 101. At this time, the imaging unit 164 (see FIG. 2) disposed behind the reading window 103 images the item G.

The merchandise reading device 101 displays, on the display and operation unit 104, a screen for designating which of items registered in a PLU file F1 (see FIG. 3), which will be described below, the item G, of which image is captured by the imaging unit 164, corresponds to. This screen is displayed by the merchandise presentation method according to the embodiment. Then, the merchandise reading device 101 provides a merchandise code of the designated item to the POS terminal 11.

The POS terminal 11 records information relating to sales registration such as a merchandise category of the item corresponding to the merchandise code, a merchandise name, and a unit price, based on the merchandise code provided by the merchandise reading device 101 in a sales master file (not illustrated) or the like and performs sales registration.

FIG. 2 is a block diagram of the POS terminal 11 and the merchandise reading device 101. The POS terminal 11 includes a microcomputer 60 as an information processing unit which executes information processing. The microcomputer 60 is configured such that a read only memory (ROM) 62 and a random access memory (RAM) 63 are connected to a central processing unit (CPU) 61 which executes various kinds of calculation processing and controls the respective components via a bus.

The drawer 21, the keyboard 22, the display device 23, the touch panel 26, and the display device 24 for a customer are connected to the CPU 61 of the POS terminal 11 vial various input and output circuits (not illustrated in FIG. 2). These components are controlled by the CPU 61.

A hard disk drive (HDD) 64 is connected to the CPU 61 of the POS terminal 11. The HDD 64 stores programs and various files. The programs and various files stored in the HDD 64 are entirely or partially copied by the RAM 63 and are executed by the CPU 61 at the time of activating the POS terminal 11. An example of the programs stored in the HDD 64 is a program PR for merchandise sales data processing. An example of the files stored in the HDD 64 is the PLU file F1 distributed from the store computer SC and stored thereon.

The PLU file F1 is a file, which is used as a dictionary, and in which a merchandise code uniquely allocated to each item and information (sales price) relating to sales registration are associated and recorded as illustrated in FIG. 3. In addition, an image of an item for sale may be associated with a merchandise code in the PLU file F1.

The sales price is data, which is changed and revised depending on days or time in a day and differs in each store. Therefore, the PLU file is managed by a server or the like for each store, and a set of a merchandise code which is called PLU and sales price information is stored in the POS terminal 11.

FIG. 4 illustrates a data structure of a table according to the embodiment.

Although a set of a merchandise code and feature value information is usually called a dictionary, the set will be referred to as a table in FIG. 4 since other display information is also collectively managed in the table according to the embodiment.

In the table in FIG. 4, a merchandise code represents an identification code of an item for sale, and a specific merchandise name and a feature value are defined. Furthermore, indexes and Categories 1 to 3 are defined for display purpose. The indexes correspond to initials of merchandise names. As for the categories, Category 1 is a large category such as fruits, and Categories 2 and 3 are smaller categories as the reference numbers increase. The smallest category is a merchandise name itself, which has a one-to-one correspondence with a merchandise code.

However, since each item has a different set of categories, "Kiwi Gold" as a merchandise name coincides with "Kiwi Gold" as a category name of Category 3 while "Gobo" (burdock root) as a merchandise name coincides with "Gobo" as a category name of Category 2 and Category 3 is non-applicable (a line represents that there is no category name) in FIG. 4. By comparing a feature value of an input image and the respective feature values in the table in FIG. 4, similarities are calculated. FIG. 5 illustrates FIG. 4 in a simplified manner for explanation, and calculated similarities are associated with the respective merchandise codes.

In addition, images of items for sale may be associated with the merchandise codes in the table illustrated in FIG. 4.

Returning to FIG. 2, a communication interface 25 for executing data communication with the store computer SC is connected to the CPU 61 of the POS terminal 11 via an input and output circuit (not illustrated). The store computer SC is installed in a backyard or the like of a store. An HDD (not illustrated) of the store computer SC stores the PLU file F1 to be distributed to the POS terminal 11.

Furthermore, a connection interface 65, which enables data exchange with the merchandise reading device 101, is connected to the CPU 61 of the POS terminal 11. The merchandise reading device 101 is connected to the connection interface 65. In addition, a printer 66 which performs printing of a receipt or the like is connected to the CPU 61 of the POS terminal 11. The POS terminal 11 is controlled by the CPU 61 to print content of one transaction as a receipt.

The merchandise reading device 101 also includes a microcomputer 160. The microcomputer 160 is configured such that a ROM 162 and a RAM 163 are connected to a CPU 161 by a bus. The ROM 162 stores a program for causing the CPU 161 to execute the merchandise presentation method according to the embodiment.

The RAM 163 is used as a working area for the program to execute the merchandise presentation method. For example, a feature value calculated for each item is associated and stored with a merchandise code as will be described below. In addition, the program for executing the merchandise presentation method according to the embodiment is not limited to a program stored in the ROM 162. For example, the program may be stored in the HDD 64 of the POS terminal 11 or may be stored in an external storage device (an HDD, a USB, or the like).

An imaging unit 164 and a sound output unit 165 are connected to the CPU 161 via various input and output circuits (not illustrated in FIG. 2). Operations of the imaging unit 164 and the sound output unit 165 are controlled by the CPU 161. The display and operation unit 104 is connected to the merchandise reading unit 110 and the POS terminal 11 via a connection interface 176. Operations of the display and operation unit 104 are controlled by the CPU 161 of the merchandise reading unit 110 and the CPU 61 of the POS terminal 11.

The imaging unit 164 is a color CCD image sensor, a color CMOS image sensor, or the like and is an imaging section for capturing an image through the reading window 103 under control of the CPU 161. For example, the imaging unit 164 captures a video image at 30 fps. Each of the frame images (captured images) sequentially captured at a predetermined frame rate by the imaging unit 164 is saved in the RAM 163.

The sound output unit 165 includes a sound circuit for generating alert sound or the like set in advance and a speaker. The sound output unit 165 provides information by the alert sound or other sound under control of the CPU 161.

Furthermore, a connection interface 175, which is connected to the connection interface 65 of the POS terminal 11 and enables data exchange with the POS terminal 11, is connected to the CPU 161. In addition, the CPU 161 exchanges data with the display and operation unit 104 via the connection interface 175.

Figure 6:
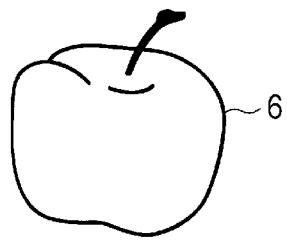
FIG. 6 illustrates an apple as an example of an item for sale without a barcode.
Figure 7:
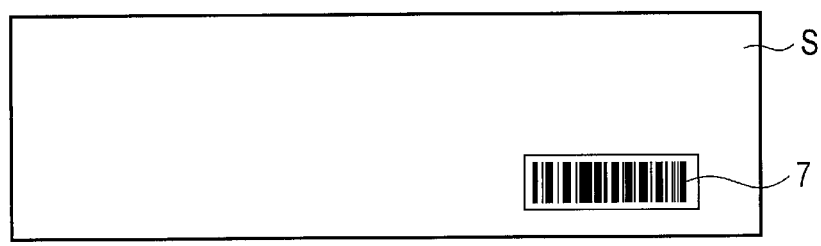
FIG. 7 illustrates an item for sale with a barcode attached thereto.

FIG. 6 illustrates an apple 6 as an example of the item for sale. FIG. 7 illustrates a barcode 7 attached to an item for sale S.

The item 6 is held near the reading window 103 of the merchandise reading device 101 when recognition processing of the item is performed, and when the barcode 7 of the item S is held near the reading window 103 when barcode reading is performed. Then, processing for specifying the merchandise is performed based on the read image, and a result of the processing is displayed on the display device 106.

The operator selects an item to be purchased through the touch panel 105. Identification information of the selected item is transferred from the merchandise reading device 101 to the POS terminal 11, and a merchandise price is displayed on the display device 23.

It is also possible for the operator to directly input information about the item to be purchased through the touch panel 105 without imaging the item. Even in such a case, the identification information of the item to be purchased is transferred to the POS terminal 11, and the merchandise price is displayed on the display device 23.

According to the embodiment, a merchandise code is determined by the merchandise reading device 101 by operating in various modes (a table processing mode, a recognition processing mode, and a barcode reading mode), the merchandise code is received by the POS terminal 11, and checkout processing is performed. An overall flow of the devices will be described below.

The operational modes of the check-out system according to the embodiment include the table processing mode, the recognition processing mode, and the barcode reading mode.

Figures 8, 9:
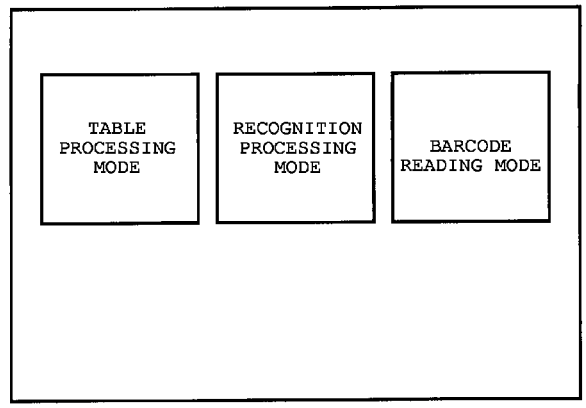
FIG. 8 illustrates a relationship of selection screens, operation types, and operational modes.
FIG. 9 illustrates an operational mode selection screen.

FIG. 9 illustrating an operational mode selection screen. The operator may select an item to be purchased during a selected operational mode after selecting any of the table processing mode, the recognition processing mode, and the barcode reading mode through the operational mode selection screen in FIG. 9.

The "table processing mode" is a mode in which the item to be purchased is selected basically using the touch panel. The "recognition processing mode" is a mode in which the item to be purchased is imaged by the imaging unit 164 and then the item is selected through recognition processing of the item based on the obtained image. The "barcode reading mode" is a mode in which the item to be purchased is selected through reading the barcode of the item.

The recognition processing mode and the table processing mode usually may be used for items which generally require a time and an effort to attach barcodes thereon, such as vegetables and fruits (e.g., an apple in FIG. 6).

In addition, the barcode reading mode usually may be used for packaged products. Here, the packaged products mean items (which are wrapped with some packages, and to which barcodes corresponding to the items are attached as shown in FIG. 7. The barcode reading mode can be selected through the selection screen illustrated in FIG. 9. Then, by directing the barcode (for example, the barcode 7 in FIG. 7) towards the reading window 103, a known barcode technique is used to decode the barcode into a merchandise code.

In addition, the operational modes of the check-out system according to the embodiment includes two modes, namely the recognition processing mode and the table processing mode for a non-barcode item (e.g., the apple in FIG. 6). The operator may select the item to be purchased using the table processing mode if the operator knows well about the item, and may select a more convenient scheme for the operator, i.e., the recognition processing mode, if the operator is not sure of the item to be purchased.

As processing of obtaining a merchandise code from a non-barcode item, the table processing mode may be based on a conventional scheme, and the recognition processing mode may be based on a relatively newer scheme which employs the image recognition technique.

Furthermore, the table processing mode further has two operational types for convenience of the operator. The recognition processing mode also has two operational types in accordance with the types of the table processing mode.

FIG. 8 illustrates relationship of the selection screens, the operational types, and the operational modes.

The table processing mode according to the embodiment will be described with reference to FIGS. 10A and 11A, and the recognition processing mode will be described with reference to FIGS. 10B and 11B. In addition, the recognition processing mode is achieved by employing the known image recognition technique. As to the recognition processing mode in which an item to be purchased is specified based on an image of the item, accuracy of the specification is not 100%. Therefore, processing until candidate presentation is performed, and the operator finally selects an item to be purchased in the embodiment described herein.

The table processing mode is based on a scheme which is used for a system that does not have the recognition processing mode, and an operational mode in which the operator looks at an item for sale without a barcode attached thereto, identifies the item, and selects the item on an operation unit.

According to the check-out system of the embodiment, Type A or Type B is selected as the operational type in an initial setting. In Type A operation, an interface including merchandise categories (Category 1 in FIG. 4) is displayed as illustrated in FIG. 10A, and the operator can sequentially narrow down to the merchandise name by selecting an appropriate category. For example, the operator selects fruits and then Kiwi fruits.

Figure 10A:
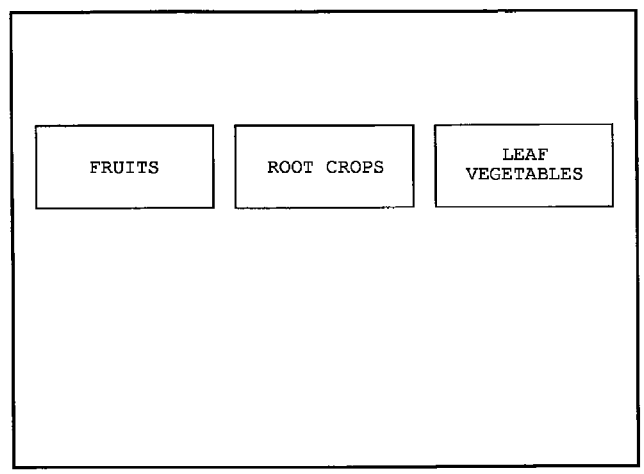
FIG. 10A illustrates a selection screen for Type A operation of a table processing mode.
Figure 10B:
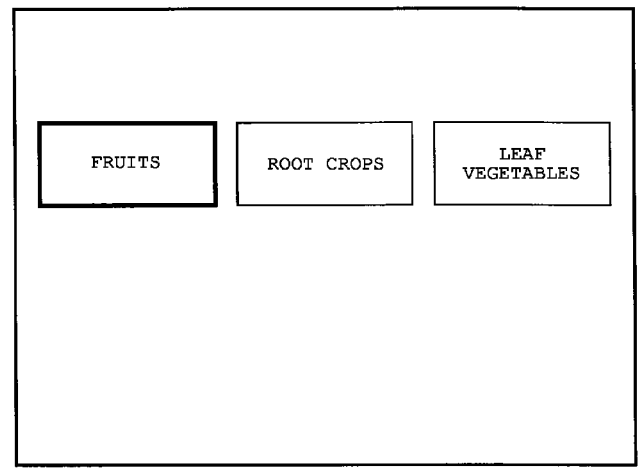
FIG. 10B illustrates a selection screen for Type B operation of the table processing mode.

Although not illustrated in the drawing, the item to be purchased is finally selected after selecting fruits in FIG. 10A and then performing a procedure of narrowing down the scope of the category such as citrus fruits and pomaceous fruits when there are a large number of items classified in the category of fruits. This scheme has an advantage in that it is possible for the operator who does not know well about the item to finally find the target item after the processes and to thereby prevent an operational error although the number of procedural steps is large.

Figure 11A:
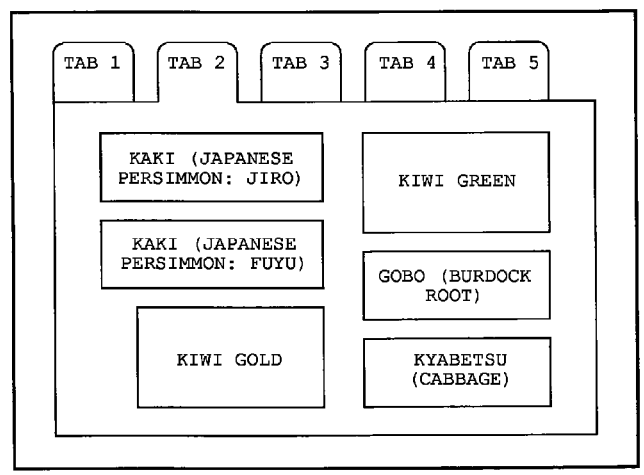
FIG. 11A illustrates a selection screen for Type A operation of a recognition processing mode.

In Type B operation, an initial character of a merchandise name is used as an index, and if an index is selected, a merchandise list is displayed as illustrated in FIG. 11A.

Since an experienced operator may quickly recognize the item to be purchased and figures out the merchandise name when the operator sees the item, it is generally possible to select the item to be purchased through a fewer steps than in Type A by the selection of the initial.

As described above, referring to FIGS. 10A and 11A, the operations carried out during the table processing mode is described.

Next, a description will be given of operations of Type A and Type B during the recognition processing mode.

In the recognition processing mode, a feature value of each item for sale, a conceptual structure (Categories 1 to 3 and indexes) of each item for sale, a merchandise code, and the like as illustrated in FIG. 4 are read from the store computer SC, are stored in the HDD 64, and are then held in the RAM 163 or the like of the merchandise reading unit 110 in FIG. 2 via the connection interface 175. Thereafter, a feature value of the item to be purchased is calculated by the CPU 161 of the merchandise reading unit 110 illustrated in FIG. 2 based on the image captured by the imaging unit 164 in FIG. 2 using the known image recognition processing, and is compared with the feature values of the items in the table in FIG. 4 to calculate similarities.

The processing described above is common to Type A operation and Type B operation of the recognition processing mode.

Figure 12A:
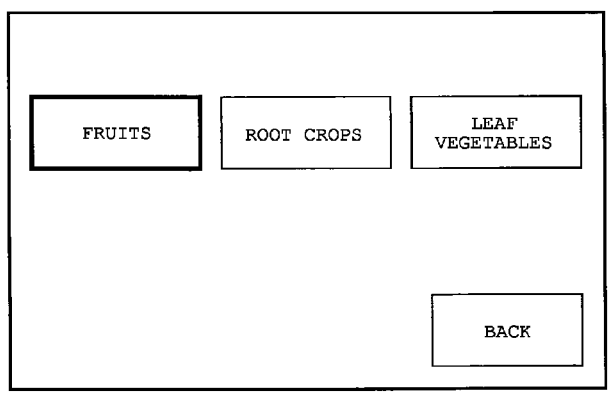
FIGS. 12A to 12D each illustrate a selection screen for Type A operation of the recognition processing mode.
Figure 12B:
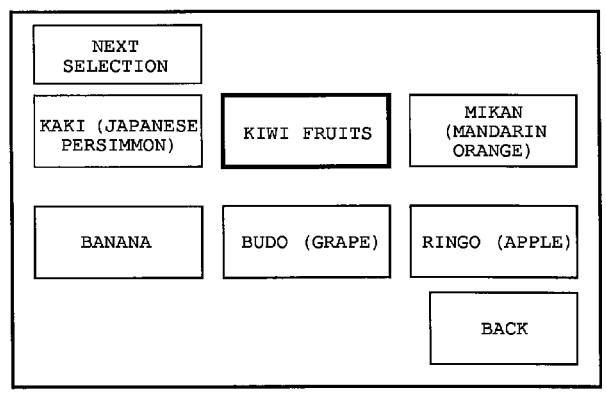
Figure 12C:
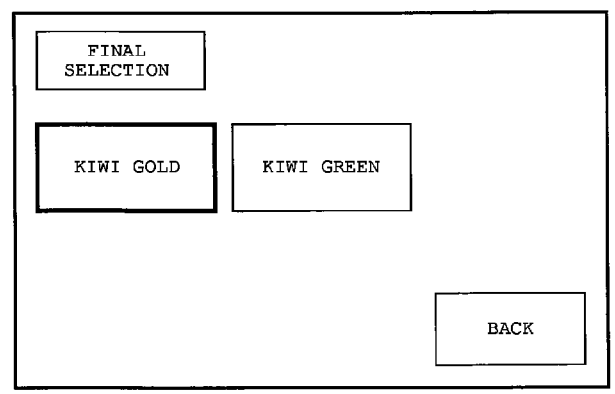

Next, it is assumed that the item to be purchased is Kiwi Gold and that a similarity of Kiwi Gold is determined to be high as a result of calculation, for example, in the Type A operation. Based on the information, the item to be purchased is specified in a stepwise manner as illustrated in FIGS. 12A to 12C. In the screens shown in FIGS. 12A to 12C, candidate categories (categories 1 to 3) of the item to be purchased, which is determined to have high similarity by the recognition processing, are displayed in an emphasized manner.

Category 1, Category 2, and Category 3 for Kiwi Gold in FIG. 4 are "Fruits," "Kiwi fruits," and "Kiwi Gold". As illustrated in the selection screen in FIG. 12A, "Fruits" is displayed in the emphasized manner in the screen to display Category 1. If the operator selects "Fruits" displayed on the selection screen illustrated in FIG. 12A, merchandise categories in Category 2 are presented on the selection screen in FIG. 12B, and "Kiwi fruits" is displayed in the emphasized manner.

Then, if the operator selects "Kiwi fruits," the selection screen in FIG. 12C is displayed, and "Kiwi Gold" is displayed in the emphasized manner. As described above, as the merchandise category with high similarities is displayed in the emphasized manner, in each of the selection screens, the operator can easily select an appropriate merchandise category and narrow down to the item to be purchased in the stepwise manner like Type A operation of the table processing.

On the selection screens in FIGS. 12A to 12C, it is also possible to select an icon other than the emphasized icon. In addition, an icon to return to a previous screen "Back" is provided on the screen. Furthermore, whether the selection screen is a final screen or a screen which may be transferred to a next screen is illustrated to the operator by "Next selection" and "Final selection."

Figure 12D:
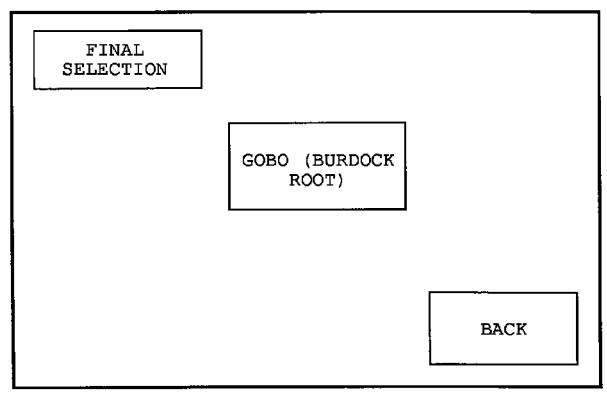

If the operator selects root crops on the selection screen in FIG. 12A, the selection screen in FIG. 12D is displayed although "Lobo (burdock root)" is not displayed in the emphasized manner as the candidate with a high similarity is "Kiwi Gold." Furthermore, since there are only Category 1 and Category 2 for "Lobo (burdock root)," "Final selection" is displayed.

In Type B operation, display may be performed in the same manner as in the selection screen of FIG. 11A by using indexes and the like in FIG. 4 and similarity information used in the recognition processing mode. The recognition processing mode is different from the table processing mode in FIG. 11A in that a candidate with the highest similarity is displayed in the emphasized manner in the same manner as in Type A.

Figure 11B:
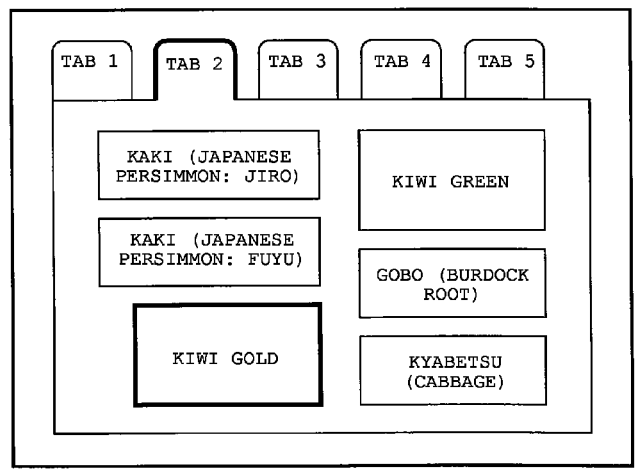
FIG. 11B illustrates a selection screen of Type B operation of the recognition processing mode.

The selection screen illustrated in FIG. 11B in Type B operation of the recognition processing mode is the same selection screen as that of the table processing mode illustrated in FIG. 11A. By using the recognition processing, support information (emphasized display by using a bold line in the embodiment) for selecting an item with the highest similarity is added.

FIG. 11B illustrates an example in which "Kiwi Gold" in Category 3 as the merchandise name and "KA column" as an index are displayed in the emphasized manner.

As the selection screens for the recognition processing mode is similar to those for the table processing mode, it is not necessary for the operator to learn a new operation pattern for the recognition processing mode, and the operator may use the new operational mode even if the new operational mode (the recognition processing mode in this example) is different from the table processing mode.

Next, a description will be given of operations carried out by the check-out system according to the embodiment with reference to a flowchart.

Figure 13:
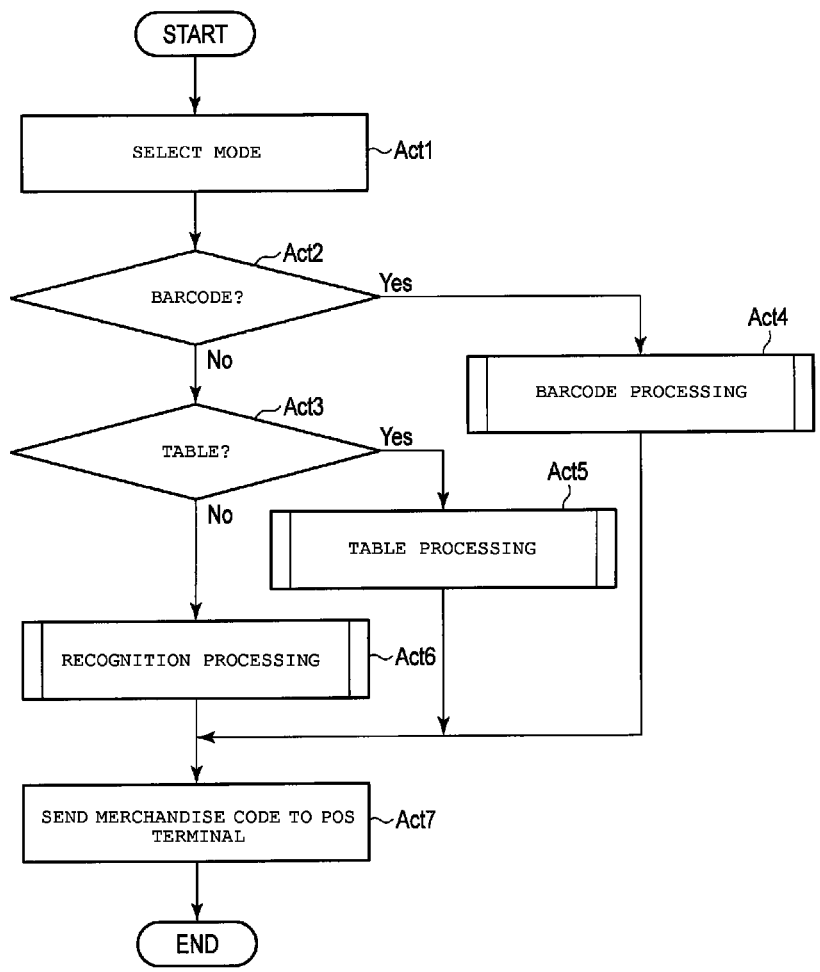
FIG. 13 is a flowchart of process carried out by the merchandise reading device.

FIG. 13 is a flowchart illustrating processing carried out by the merchandise reading device 101.

First, the display device 106 in the merchandise reading device displays the operational mode selection screen as illustrated in FIG. 9. The merchandise reading device 101 receives operator's selection of a mode (Act1).

Then, in Act2, it is determined whether or not the mode, selection of which is received in Act1, is the barcode reading mode. If it is determined that the mode, selection of which is received in Act1, is the barcode reading mode, the barcode processing is performed (Act4).

If it is determined that the mode, selection of which is received in Act1, is not the barcode reading mode, it is determined whether or not the mode is the table processing mode (Act3).

If it is determined in Act3 that the mode, selection of which is received, is the table processing mode, the table processing is performed in Act5. In contrast, if it is determined that the mode is not the table processing mode, the recognition processing is performed (Act6).

As a result of the barcode processing (Act4), the table processing (Act5), and the recognition processing (Act6), a merchandise code of a finally selected item is obtained. The thus obtained merchandise code is sent to the POS terminal 11 (Act7), and the processing is completed.

Figure 14:
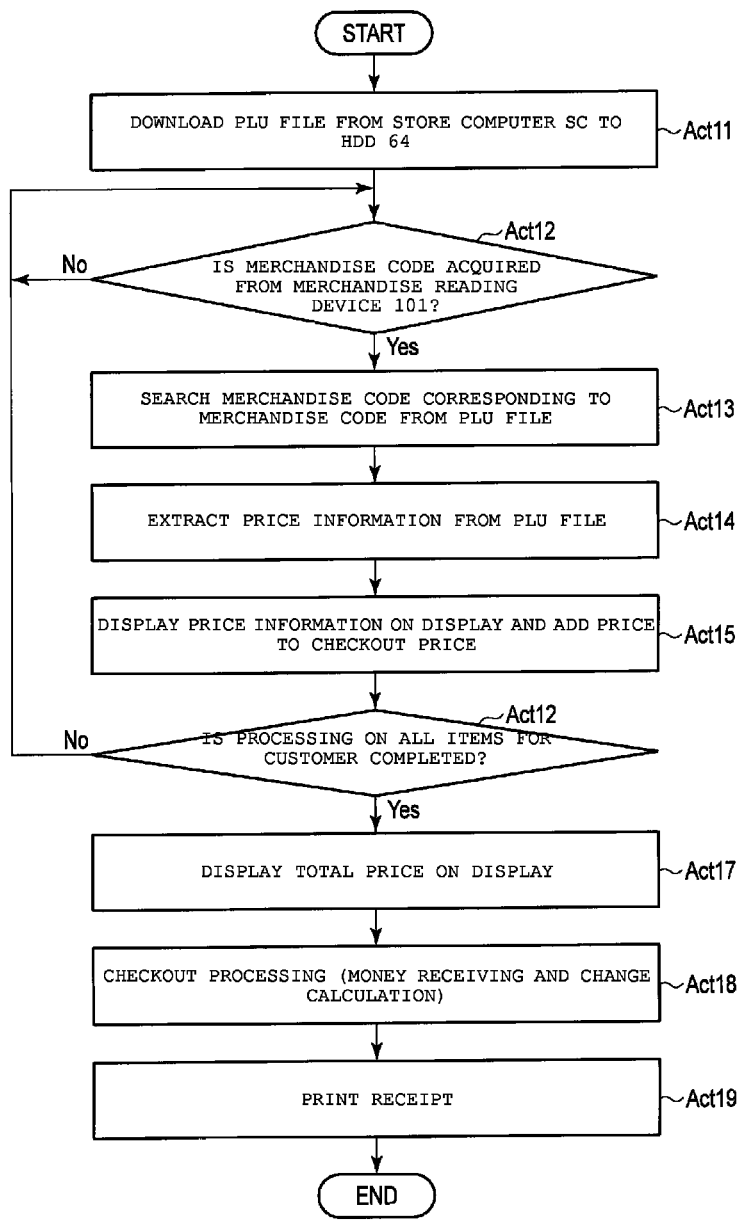
FIG. 14 is a flowchart of process carried out by the POS terminal.

Next, a description will be given of processing carried out by the POS terminal 11 with reference to the flowchart in FIG. 14.

In the POS terminal 11, the price look-up (PLU) file F1 is downloaded from the store computer SC to the HDD 64 first (Act11).

Then, the POS terminal 11 determines whether or not a merchandise code is obtained from the merchandise reading device 101 (Act12).

If it is determined in Act12 that the merchandise code is obtained from the merchandise reading device 101, the obtained merchandise code is searched in the PLU (Act13), and a sales price of the item for sale with the corresponding merchandise code is extracted from the PLU file (Act14).

Then, the sales price extracted in Act14 is displayed on the display device 23 and the display device 24 for a customer, and the sales price is added to a checkout price (Act15). Then, it is determined whether or not the processing is completed for all the items to be purchased by the customer (Act16).

If it is determined in Act16 that the checkout processing is not completed on all items, the processing returns to Act12. In contrast, if it is determined that calculation of the checkout price for all items is completed, the total checkout price is displayed on the display device 23 and the display device 24 for a customer (Act17).

The POS terminal 11 performs checkout processing of receiving money, which is received from the customer by the operator, from the drawer 21 and outputting change (Act18). Then, the printer 68 of the POS terminal 11 prints information of the checkout price and the amount of the change as the receipt (Act19).

Figure 15:
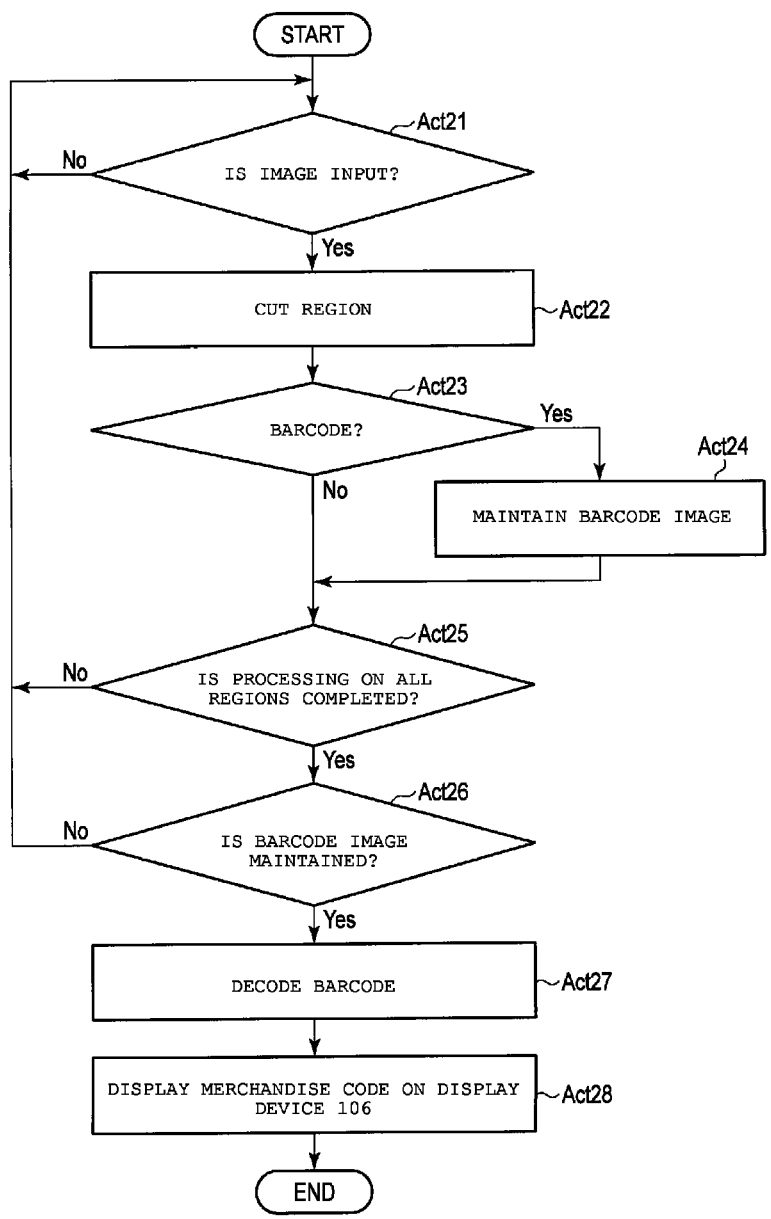
FIG. 15 is a flowchart of barcode processing.

Next, a description will be given of the barcode processing in Act4 carried out by the merchandise reading device 101 with reference to the flowchart in FIG. 15.

First, it is determined whether or not an image is input from the imaging unit 164 (Act21). For the input of the image, a variation in input images is monitored, and if the variation in input images is detected, it is determined that an image is input, and the image is treated as an input image.

If the image is input, region cutting processing is performed using known region splitting processing or the like (Act22). Then, it is determined whether or not the image in the cut region is a barcode using a known pattern matching technique or the like (Act23).

If it is determined in Act23 that the image in the cut region is a barcode, the image in the region is maintained (Act24). If it is determined in Act23 that the image in the cut region is not a barcode, or after the image in the barcode region is maintained in Act24, then it is determined that whether or not determination with respect to all target regions of the input image is completed (Act25).

If it is determined in Act25 that the determination with respect to all the target regions is not completed, the processing returns to Act21. In contrast, if it is determined that the determination with respect to all the target regions is completed, then it is determined whether or not the barcode image is maintained in Act24 (Act26).

If it is determined in Act26 that the barcode image is not maintained, it is determined that no barcode is imaged, a message for prompting the operator to show the barcode again is displayed on the display device 106, and the processing returns to Act21.

In contrast, if it is determined in Act26 that the barcode image is maintained, a merchandise code is extracted from the barcode image using known barcode decoding processing (Act27).

Then, the merchandise code decoded in Act27 is displayed on the display device 106 (Act28), and the obtained merchandise code is sent to the POS terminal 11 as illustrated as Act7 in FIG. 13.

Next, a description will be given of the table processing in Act5 carried out by the merchandise reading device 101 with reference to the flowchart in FIG. 16.

First, Type information input in the initial setting which is not illustrated in the drawing is extracted from a memory or the like, and it is determined which of Type A and Type B the extracted Type information corresponds to (Act31).

If a determination result of Act31 is Type A, a completion flag and category levels (corresponding to Category 1/Category 2/Category 3 in FIG. 4) are initialized. Specifically, the completion flag is set to 0, and Category N is set to 1 (Act32).

Then, a selection screen in accordance with a current Category N is displayed on the display device 106 (Act33). First, selection screen in accordance with Category 1 is displayed (corresponding to the selection screen illustrated in FIG. 10A).

Then, it is determined whether or not current Category N is the final category by using the table in FIG. 4 (Act34). Here, the table in FIG. 4 is commonly used for both Type A and Type B of the table processing and the recognition processing.

If it is determined in Act34 that current Category N is the final category, a final flag is set (final flag=1), and a message indicating the "final selection" is displayed on the display device 106 (Act35).

If it is determined in Act34 that current Category N is not the final category, a message "Next selection" is displayed on the display device 106 (Act36). After the processing of Act35 or Act36, operator's selection through the selection screen for Category N is received (Act37).

Then, it is determined whether the final flag is set (final flag=1) (Act38). If it is determined in Act 38 that the final flag is not set, Category N is incremented by one level (Category N=N+1) in Act39, the processing returns to Act33, and the operator is prompted to make selection again.

In contrast, if it is determined in Act38 that the final flag is set, it is determined that the selection input for Category N is the final selection of the item to be purchased, and the merchandise code of the selected item is extracted from the table in FIG. 4 (Act40).

Although there is no description about a "Back" input and about a case where final selection and next selection are present together for Category N in the embodiment in order to simplify explanation, a desired operation may be performed by processing in consideration of such cases.

If the determination result in Act31 is Type B, an index initial selection screen is displayed (Act41). Specifically, information at upper locations in the selection screen in FIG. 11A, such as "A column", "KA column", "SA column", and "TA column" are referred to as indexes, and a state where the screen for "A column" is displayed on the top is regarded as an initial state, for example.

If operator's selection of an index is received (Act42), the selected index appears on the top, and a selection screen for items included in the selected index is displayed (Act43). FIG. 11A illustrates a selection screen when "KA column" is selected.

The table in FIG. 4 includes "indexes," and information of X-Y is stored with respect to each of the item for sale. X represents an index the item for sale is associated with, and Y represents a display order in the corresponding index.

On the selection screen in FIG. 11A, for example, items are displayed in an order in accordance with the value of Y, such as in the order of fruits, root crops, and leaf vegetables in Category 1, in accordance with the information in FIG. 4. If operator's selection of an item from the selection screen is received (Act44), a merchandise code of the selected item is extracted from the table in FIG. 4 (Act45).

The table processing is completed here for both Type A and Type B, and the merchandise code is sent to the POS terminal 11 in Act7 shown in FIG. 13.

Next, a description will be given of the recognition processing in Act6 on the side of the merchandise reading device 101 with reference to the flowcharts in FIGS. 17 and 18.

Figure 16:
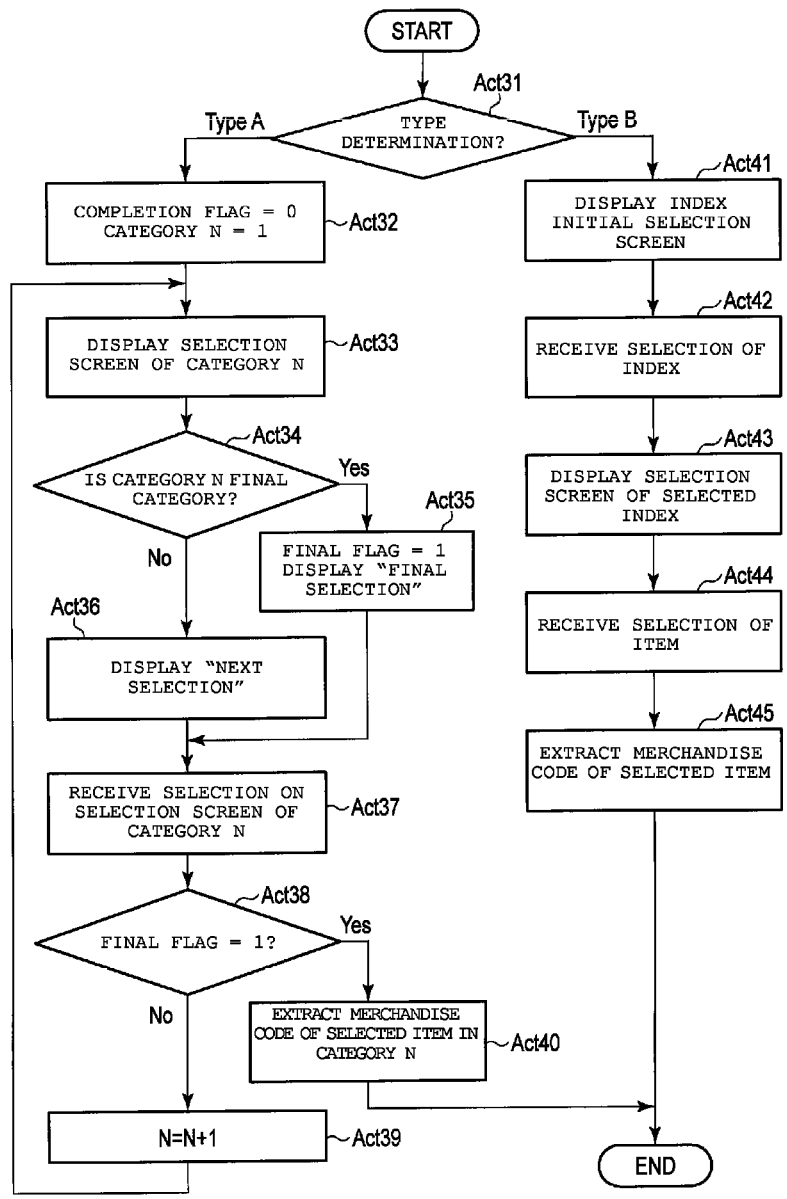
FIG. 16 is a flowchart of table processing.
Figure 17:
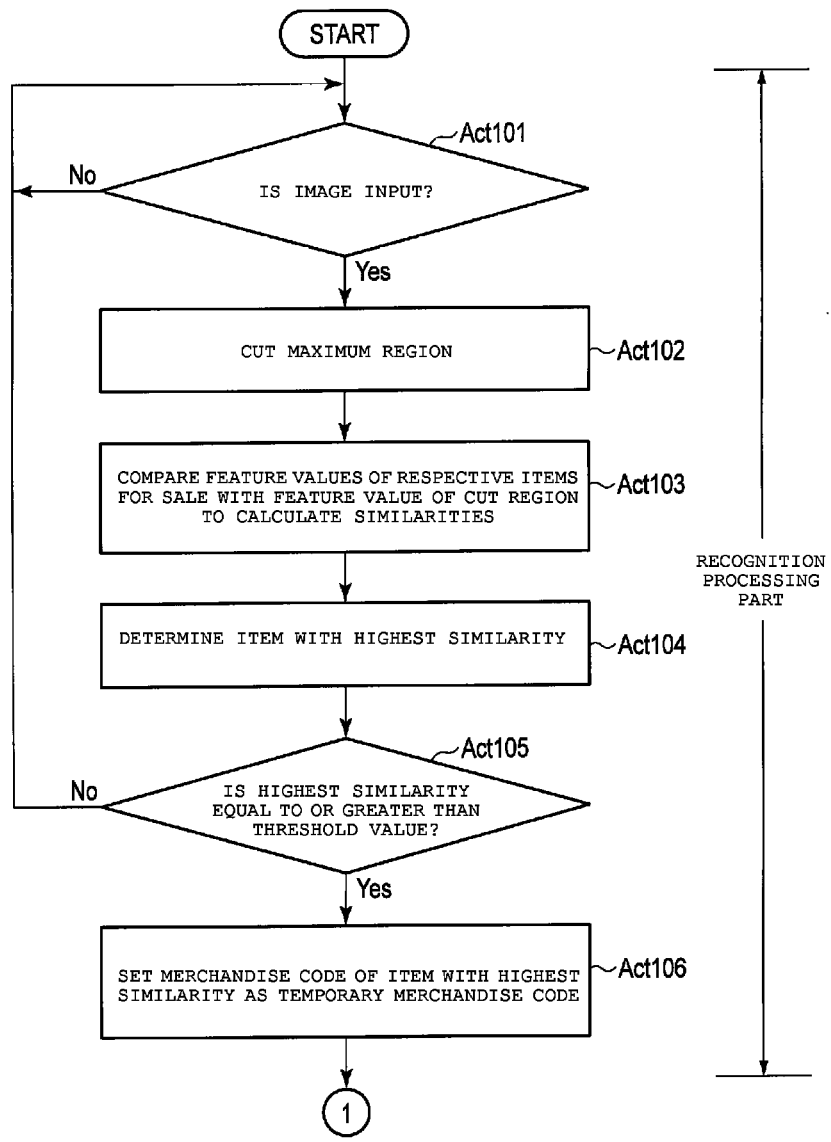
FIGS. 17 and 18 are flowcharts of recognition processing.
Figure 18:
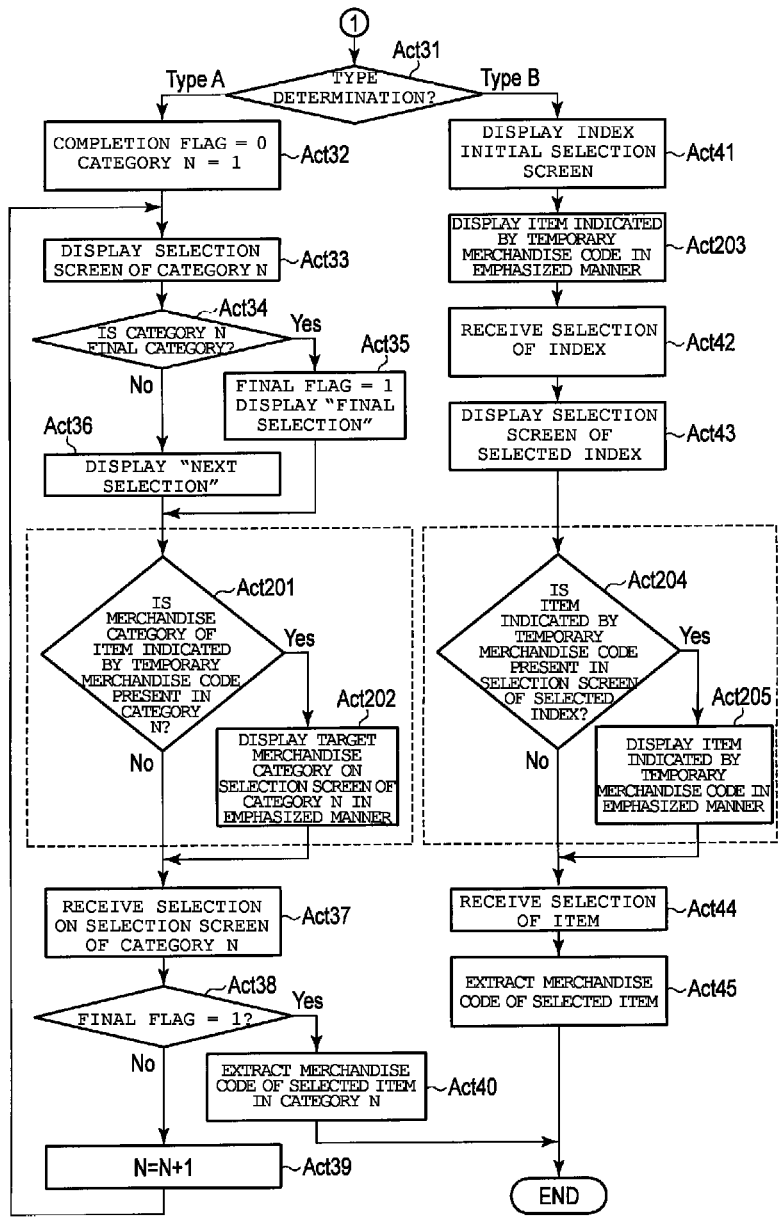

The recognition processing in Act6 corresponds to Act101 to Act106 relating to the recognition processing in FIG. 17 and Act201 to Act205 relating to the emphasized display processing shown in FIG. 18, in addition to the process of the table processing shown in FIG. 16. The description of the same Acts as those in FIG. 16 will be omitted here, and different part will be described below.

In Act101, it is determined whether or not an image is input from the imaging unit 164 (Act21). For the input of the image, a variation in input images is monitored, and if the variation in input images is detected, it is determined that an image is input, and the image is treated as an input image, for example.

If it is determined in Act101 that an image is input, the largest region in the input image is extracted as target image data (Act102). Then, a feature value is calculated from the extracted image data using the known recognition processing. Then, the calculated feature value of the target image data is compared with feature values of the items for sale illustrated in FIG. 4 to calculate similarities (Act103).

Next, an item with the highest similarity is determined based on the similarities of the respective items calculated in Act103 (Act104). Then, it is determined whether or not the highest similarity is equal to or greater than a threshold value (Act105).

If it is determined in Act105 that the highest similarity is not equal to or greater than the threshold value, the processing returns to Act101. In contrast, if it is determined that the highest similarity is equal to or greater than the threshold value, a merchandise code of the item with the highest similarity is set as a temporary merchandise code (Act106).

Although Act101 to Act106 described above correspond to the processing relating to the recognition processing according to the embodiment, a merchandise recognition method is not limited thereto.

After the temporary merchandise code is set in Act106, it is determined that which of Type A and Type B the type information corresponds to in Act31. If a determination result is Type A, the processing of Act32 through Act36 is performed as described above with reference to FIG. 16.

After the processing of Act35 or Act36, it is determined whether or not a merchandise category of the item which is indicated by the temporary merchandise code is present in current Category N with reference to the table in FIG. 4 (Act201). If it is determined in Act201 that the merchandise category of the item indicated by the temporary merchandise code is present in current Category N, the merchandise category of the item indicated by the merchandise code is displayed in the emphasize manner on the selection screen of Category N (Act202).

For example, it is assumed that the temporary merchandise code indicates Kiwi Gold.

Since the temporary merchandise code indicates Kiwi Gold, Category 1 of the temporary merchandise code is "Fruits," Category 2 thereof is "Kiwi fruits," and Category 3 is "Kiwi Gold" in the table in FIG. 4.

Therefore, the selection screen of Category 1 is as illustrated in FIG. 12A, and the category of "Fruits" is displayed in the emphasized manner. In addition, the selection screen of Category 2 is as illustrated in FIG. 12B, and the category of "Kiwi fruits" is displayed in the emphasized manner. The selection screen of Category 3 is as illustrated in FIG. 12C, and the merchandise "Kiwi Gold" is displayed in the emphasize manner.

If the operator selects "Root crops" on the selection screen of Category 1 illustrated in FIG. 12A, then the selection screen illustrated in FIG. 12D is displayed. The item "Kiwi Gold" indicated by the temporary merchandise code does not belong to "Root crops" as Category 1 illustrated in FIG. 4. Therefore, emphasized display is not performed on the selection screen illustrated in FIG. 12D.

After completion of the processing in Act201 or Act202, operator's selection on the select screen of Category N is received (Act37). Thereafter, the processing of Act38 through Act40 is performed as described above with reference to FIG. 16.

In contrast, if the determination result in Act31 is Type B, the index initial selection screen is displayed as described above with reference to FIG. 16 (Act41). Then, the item indicated by the temporary merchandise code and the index thereof are displayed in the emphasized manner (Act203).

For example, it is assumed that the temporary merchandise code corresponds to "Kiwi Gold." Since the index of "Kiwi Gold" belongs to "KA column" illustrated in the table in FIG. 4, the index "KA column" is displayed in the emphasized manner in the index initial screen as illustrated in FIG. 11B.

In addition, items corresponding to the merchandise codes, which belong to the "KA column" as the index (such as Kaki (Japanese persimmon: Jiro), Kaki (Japanese persimmon: Fuyu), Kiwi Gold, Kiwi Green, Gobo (burdock root), and Kyabetsu (cabbage)) are displayed. Furthermore, "Kiwi Gold" corresponding to the temporary merchandise code is displayed in the emphasized manner.

In the embodiment, an item, which is to be finally selected, is displayed in the selected index, and therefore, the embodiment is configured on the assumption that the item corresponding to the corresponding merchandise code is necessarily displayed.

If the category of "Kiwi fruits" is displayed, there is a possibility in that the item is "Kiwi Gold" or "Kiwi Green." Since a plurality of corresponding merchandise codes is present in this case, the category of "Kiwi fruits" is not the merchandise name of an item that is to be finally selected. Therefore, if the category of "Kiwi fruits" is one of candidates, one of or both "Kiwi Gold" and "Kiwi Green" are displayed although the category of "Kiwi fruits" is not displayed.

Thereafter, if the operator's selection of an index is received (Act42), the selected index appears on the top, and the selection screen for items included in the selected index is displayed (Act43).

After Act43, it is determined whether or not the item corresponding to the temporary merchandise code is present in the screen of the selected index (Act204). If it is determined in Act204 that the item corresponding to the temporary merchandise code is present in the screen of the selected index, the item and the index thereof are displayed in the emphasized manner on the selection screen of the selected index (Act205).

The determination in Act204 on whether or not the item corresponding to the temporary merchandise code is present in the screen of the selected index may be made by performing a simple search. For example, if the item corresponding to the temporary merchandise code is "Kiwi Gold" and the index of "KA column" is selected, the merchandise code of the item is searched from merchandise codes listed in indexes from "KA-KA" to "KA-KO."

If operator's selection of the item from the selection screen is received (Act44) after the processing in Act204 or Act205, the merchandise code of the selected item is extracted from the table in FIG. 4 (Act45).

The recognition processing is completed here for both Type A and Type B, and the merchandise code is sent to the POS terminal 11 as illustrated in Act7 in FIG. 13.

As the foregoing illustrates, the information processing apparatus according to the embodiment approximates the operator user interface for the recognition processing to an operation user interface for table processing. With such a configuration, it is possible to reduce stress when the operator newly learns the operation procedure. In addition, it is possible to provide a function of supporting the user operations.

Although the information processing apparatus according to the embodiment includes a switching processing function between Type A and Type B in the above description. However, a product configuration in which only one of Type A and Type B or only a table processing mode other than Type A and Type B is available may be considered. In such a case, it is possible to provide an information terminal apparatus which does not burden the operator with efforts to learn operations by providing an operation screen of the recognition processing mode in accordance with the table processing mode.

The above embodiment is described on the assumption that a salesperson of a foodstuff store or the like may operate the apparatus. In addition, an information terminal of a self-check-out scheme which is operated by a consumer themselves in a store to perform the checkout processing is being introduced in recent years. In such a case, as the customer may not be familiar with the operation thereof as compared with the salesperson, an increase in operation patterns may burden the customer with the unfamiliar operation procedure.

Therefore, it is possible to expect an effect of suppressing an increase in operation burden while providing an advantage of a new operation mode by providing a new operation method in accordance with the existing operation method as in the embodiment.

According to the embodiment, the recognition processing mode is configured to use completely the same screen, the operation procedure, and the I/F processing as those in the table processing mode other than that emphasized processing of an item with a high similarity is additionally performed. However, a level in which the screen, the operation procedure, and the I/F processing are commonly used may be designed depending on a balance between advantages and a burden, and is not limited to the embodiment.

In the embodiment, it is not necessary to perform the scanning of the item to be purchased in the table processing mode and the determination relating to an input of an image is skipped in the table processing mode in order to cause the operator to be clearly aware of the operation mode. Also, it is possible to skip the selection processing in Act1 (FIG. 9) by adding processing of automatically switching between the barcode processing and the recognition processing based on an input image. For switching between the table processing and the recognition processing in such a case, the selection screens in FIG. 10B and FIG. 11B are displayed (in the emphasized manner as recognition processing results) if an item to be purchased is imaged and the captured image is not a barcode. The selection screens in FIG. 10A and FIG. 11A are displayed (with no information such as emphasized display) if the captured image is not input. With such a configuration, it is possible to reduce operation steps to be carried out by the operator.

Although the result of the recognition processing is emphasized in the embodiment, the method of using the recognition processing and the result of the recognition processing method are not limited thereto.

A subject which executes the operations is a subject relating to a computer such as hardware, a composite body of hardware and software, software, or software being executed. Although examples of the subject which executes the operations include a process executed on a processor, the processer, an object, an execution file, a thread, a program, and a computer, the embodiments are not limited thereto. For example, an information processing apparatus or an application which is executed in the information processing apparatus and executes the operation is also applicable as the subject. A process or a thread may be caused to function as a plurality of subjects which execute the operations. The subject which executes the operations may be provided in a single information processing procedure or may be divided into a plurality of information processing apparatuses.

The aforementioned functions may be recorded in the apparatus in advance, the same functions may be downloaded to the apparatus from a network, or the same functions stored in a recording medium may be installed in the apparatus. A recording medium with any configuration may be used as long as the recording medium may store a program as a disc ROM, a memory card, or the like and may be read by the apparatus. In addition, the functions obtained by being installed or downloaded in advance as described above may be achieved in cooperation with an operating system (OS) or the like in the apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus for identifying an item, comprising:
    an operation panel;
    a display;
    an imaging device; and
    a controller configured to:
        select an item identification mode from a plurality of item identification modes including a manual mode for identifying the item based on user inputs on the operation panel and an object recognition mode for identifying the item based on an image of the item captured by the imaging device,
        control the display to display a first graphic user interface (GUI) including a plurality of user-selectable candidates according to a first layout when the selected mode is the manual mode, and
        control the display to display a second GUI including the plurality of user-selectable candidates according to a second layout that is the same as the first layout when the selected mode is the object recognition mode, at least one of the user-selectable candidates displayed on the second GUI being displayed as a distinguished candidate, with emphasis relative to other user-selectable candidates displayed on the second GUI.

2. The information processing apparatus according to claim 1, wherein
the user-selectable candidates are candidates for the item to be identified.

3. The information processing apparatus according to claim 1, wherein
the user-selectable candidates are candidates for a category of the item to be identified.

4. The information processing apparatus according to claim 1, wherein
one of the user-selectable candidates is displayed in the first GUI with the same emphasis relative to other user-selectable candidates displayed in the first GUI.

5. The information processing apparatus according to claim 1, wherein
the controller is further configured to calculate a similarity value between image data of the image of the item captured by the imaging device and image data of items for sale that are registered in advance,
the one of the user-selectable candidates displayed with emphasis in the second GUI has a similarity value indicating the highest similarity of the items for sale.

6. The information processing apparatus according to claim 1, wherein
each of the first and second GUIs includes a plurality of user-selectable index tabs, and
user-selectable candidates categorized in one of the user-selectable index tabs are displayed in the first and second GUIs.

7. The information processing apparatus according to claim 6, wherein
in the second GUI, one of the user-selectable index tabs including the user-selectable candidate that has the similarity value indicating the highest similarity is displayed with emphasis relative to other user-selectable index tabs.

8. The information processing apparatus according to claim 1, wherein
the controller is configured to select the item identification mode based on a user input received through the operation panel.

9. The information processing apparatus according to claim 1, further comprising a data storage in which a data table is stored, wherein
the data table includes, with respect to each of an item for sale that is registered in advance, an item identification code, a category of the item, and an index tab in which the item is included, and
the controller determines the user-selectable candidates to be displayed on the first and second GUIs by referring to the data table.

10. A method for displaying graphic user interfaces (GUIs) to identify an item to be identified:
selecting an item identification mode from a plurality of item identification modes including a manual mode for identifying the item based on user inputs on the operation panel and an object recognition mode for identifying the item based on a captured image of the item;
when the selected mode is the manual mode, displaying a first GUI including a plurality of user-selectable candidates according to a first layout; and
when the selected mode is the object recognition mode, capturing an image of the item to be identified and generating image data thereof, and displaying a second GUI including the plurality of user-selectable candidates according to a second layout that is the same as the first layout, at least one of the user-selectable candidates displayed on the second GUI being displayed as a distinguished candidate, with emphasis relative to other user-selectable candidates displayed on the second GUI.

11. The method according to claim 10, wherein
the user-selectable candidates are candidates for the item to be identified.

12. The method according to claim 10, wherein
the user-selectable candidates are candidates for a category of the item to be identified.

13. The method according to claim 10, wherein
one of the user-selectable candidates is displayed in the first GUI with the same emphasis relative to other user-selectable candidates displayed in the first GUI.

14. The method according to claim 13, further comprising:
calculating a similarity value between the image data and image data of items for sale that are registered in advance, wherein
the one of the user-selectable candidates displayed with emphasis in the second GUI has a similarity value indicating the highest similarity of the items for sale.

15. The method according to claim 10, wherein
each of the first and second GUIs includes a plurality of user-selectable index tabs, and
user-selectable candidates categorized in one of the user-selectable index tabs are displayed in the first and second GUIs.

16. The method according to claim 15, wherein
in the second GUI, one of the user-selectable index tabs including the user-selectable candidate that has the similarity value indicating the highest similarity is displayed with emphasis relative to other user-selectable index tabs.

17. The method according to claim 10, further comprising:
maintaining a data table including, with respect to each of an item for sale that is registered in advance, an item identification code, a category of the item, and an index tab in which the item is included, wherein
the one or more user-selectable candidates to be displayed on the first and second GUIs are determined by referring to the data table.

18. A non-transitory computer readable medium comprising a program that is executable in a computing device to cause the computing device to perform a method for displaying graphical user interfaces (GUIs) to identify an item, the method comprising:
selecting an item identification mode from a plurality of item identification modes including a manual mode for identifying the item based on user inputs on the operational panel and an object recognition mode for identifying the item based on a captured image of the item;
when the selected mode is the manual mode, displaying a first GUI including a plurality of user-selectable candidates according to a first layout; and
when the selected mode is the object recognition mode, capturing an image of the item to be identified and generating image data thereof, and displaying a second GUI including the plurality of user-selectable candidates according to a second layout that is the same as the first layout, at least one of the user-selectable candidates displayed on the second GUI being displayed as a distinguished candidate, with emphasis relative to other user-selectable candidates displayed on the second GUI.

19. The non-transitory computer readable medium according to claim 18, wherein
the user-selectable candidates are candidates for the item to be identified.

20. The non-transitory computer readable medium according to claim 18, wherein,
one of the user-selectable candidates is displayed in the first GUI with the same emphasis relative to other user-selectable candidates displayed in the first GUI.

* * * * *